United States Patent [19]

Logothetis et al.

[11] Patent Number: 4,713,418

[45] Date of Patent: Dec. 15, 1987

[54] BLENDS OF FLUOROPLASTICS AND FLUOROELASTOMERS

[75] Inventors: Anestis L. Logothetis, Wilmington; Charles W. Stewart, Newark, both of Del.

[73] Assignee: E. I. Du Pont De Nemours and Company, Wilmington, Del.

[21] Appl. No.: 805,543

[22] Filed: Dec. 6, 1985

[51] Int. Cl.[4] .................... C08L 27/16; C08L 27/18; C08L 27/20

[52] U.S. Cl. .................................. 525/200; 525/199

[58] Field of Search ............................... 525/199, 200

[56] References Cited

U.S. PATENT DOCUMENTS

| | | | |
|---|---|---|---|
| 3,484,503 | 12/1969 | Magner et al. | 525/200 |
| 3,987,126 | 10/1976 | Brodoway | 260/884 |
| 4,128,693 | 12/1978 | Dhami et al. | 428/379 |
| 4,252,859 | 2/1981 | Concannon et al. | 428/422 |
| 4,265,789 | 5/1981 | Christopherson et al. | 252/511 |
| 4,413,094 | 11/1983 | Aufdermarsh | 525/187 |
| 4,520,170 | 5/1985 | Kitto | 525/200 |

FOREIGN PATENT DOCUMENTS 53-8650  1/1978  Japan .
53-46342 4/1978  Japan .

*Primary Examiner*—Carman J. Seccuro

[57] ABSTRACT

A composition and method for preparing it is disclosed. The composition in a blend of a cured fluoroelastomer which except for the cure sites is a perfluorocarbon and a thermoplastic copolymer of tetrafluoroethylene which is present as generally spherical particles having a particle size of less than 10 microns. The composition is prepared by blending the fluoroelastomer and thermoplastic copolymer at a temperature above the melting point of the thermoplastic copolymer followed by curing the fluoroelastomer.

17 Claims, No Drawings

BLENDS OF FLUOROPLASTICS AND FLUOROELASTOMERS

BACKGROUND OF THE INVENTION

1. Field of the Invention

The present invention relates to blends of curable fluoroelastomers and thermoplastic fluoropolymers having improved tensile strength and tear strength and the process of making them by melt blending, followed by compounding with fillers and curing agents, at below 100° C., and curing the fluoroelastomer.

2. Prior Art

U.S. Pat. No. 3,484,503 discloses single phase blends of an elastomeric copolymer of tetrafluoroethylene and perfluoro(alkyl vinyl ether) with a thermoplastic copolymer of tetrafluoroethylene. The elastomeric component does not contain a cure site and so the composition cannot be crosslinked.

U.S. Pat. No. 3,987,126 discloses blends of a curable fluoroelastomer with a fluoroelastomer having ether links in the polymer chain having perfluoroalkyl end group containing at least one terminal iodo cure site.

U.S. Pat. No. 4,413,094 discloses a co-vulcanizable fluoroelastomer blend of tetrafluoroethylene/perfluoro(methylvinyl-ether)/cure-site monomer terpolymer and hexafluoropropylene oxide/cure-site monomer copolymer.

SUMMARY OF THE INVENTION

The present invention relates to a blend of a perfluoroelastomer containing cure sites and a thermoplastic copolymer of tetrafluoroethylene. The blending, prior to curing, takes place above the softening temperature of the thermoplastic copolymer (usually above 300° C.) which results in an optically clear composition in which the thermoplastic copolymer is at least partially dissolved in the uncured elastomeric matrix followed by mixing in the curing ingredients and curing the fluoroelastomer.

DETAILED DESCRIPTION

Fluoroelastomers exhibit a very high value in use. However, they are difficult to process and several of their physical properties such as tensile strength and tear strength often are inferior to those of more conventional elastomers. It has now been found that the addition of thermoplastic copolymers of tetrafluoroethylene to curable fluoroelastomers significantly improves processing of the uncured compositions at temperatures below the melting temperature of the thermoplastic copolymer and improves the physical properties of the cured composition.

The fluoroelastomers of the present invention are capable of being crosslinked. Also, they must be sufficiently thermally stable to survive processing above the melt temperature of the thermoplastic tetrafluoroethylene copolymer. The useful level of thermoplastic tetrafluoroethylene copolymer is from 2 parts to 50 parts per 100 parts of fluoroelastomer, with from 5 parts to 30 parts thermoplastic copolymer per 100 parts of fluoroelastomers being preferred. The composition consists of finely divided thermoplastic copolymer dispersed in a matrix of amorphous fluoroelastomer. The particle size of the thermoplastic particles is less than about 10 microns. Typical fluoroelastomers for use herein are copolymers of 52–79.9 mole % and preferably 57–75 mole % tetrafluoroethylene, 20 to 45 mole % and preferably 25 to 40 mole % perfluoro(alkyl vinyl ethers), wherein the alkyl group contains from 1 to 10 carbon atoms, and a 0.1–4.0 mole % and preferably 0.2–3.0 mole % of a third comonomer which can act as a crosslink site. Cure or crosslink site monomers include vinylidene fluoride, vinyl fluoride, trifluoroethylene, $CH_2=CHR_f$ where $R_f$ is a perfluoroalkyl group of 1 to 5 carbon atoms, bromo substituted fluoroolefins containing 2 to 5 carbon atoms such as 4-bromo-3,3,4,4-tetrafluorobutene, or bromotrifluoroethylene, iodo substituted fluoroolefin containing 2 to 5 carbon atoms such as 4-iodo-3,3,4,4-tetrafluorobutene or iodotrifluoroethylene; perfluorophenoxyperfluoroalkylene vinyl ethers wherein the perfluoroalkylene group contains from 1 to 5 carbon atoms such as perfluoro-2-phenoxypropyl ether, and nitrile substituted perfluorovinyl ethers of the formula $NC(R'_f-O)_nCF=CF_2$ where $R'_f$ is a perfluoroalkylene group of 2 or 3 carbon atoms and n is 1–4.

The thermoplastic perfluorocarbon resins used herein are copolymers of tetrafluoroethylene with enough of another perfluorinated monomer to limit the molecular weight of the copolymer so that it is a melt fabricable thermoplastic. The preferred comonomers are hexafluoropropylene and perfluoroalkylvinyl ethers wherein the perfluoroalkyl group contains 1–10, and preferably 1–5 carbon atoms. Generally the comonomer will be 2 to 50 and preferably 3 to 25 mole % of the copolymer and the tetrafluoroethylene from 98 to 50 and preferably from 97 to 75 mole % of the copolymer.

The thermoplastic tetrafluoroethylene copolymer is blended with the fluoroelastomer at a temperature which is sufficiently high to melt the thermoplastic tetrafluoroethylene copolymer (usually above 300° C.). This results in a homogeneous, optically clear composition in which the tetrafluoroethylene copolymer is at least partially dissolved in the elastomeric matrix, as described in U.S. Pat. No. 3,484,503. The mixture is cooled to below 100° C. and conventional curing ingredients are mixed into the blend using standard techniques. The composition is then processed, cured and post-cured using standard conditions for fluoroelastomers. During the cure and post-cure operations the thermoplastic tetrafluoroethylene copolymer phase separates into distinct particles, more or less spherical in shape, which are visible using an optical microscope.

The particular curing agent used depends on the cure site monomer. The fluoroelastomers using bromo and iodo containing cure site monomers can be cured with peroxides such as 2,5-dimethyl-2,5-di(t-butyl-peroxy)-hexane. The fluoroelastomers containing the hydrogen cure site monomers can be cured using a bisphenol salt and a catalyst for the reaction such as hexaoxatricyclo hexaecosane. The fluoroelastomers containing the phenoxy group cure site monomers can also be cured using the bisphenol salt plus catalyst system. The fluoroelastomers containing the nitrile cure sites can be cured using tetraphenyl tin. The curing agent should be used in the molar amount appropriate for the number of cure sites present.

The cured blends of the present invention exhibit improved processing, improved tear strength, and improved modulus. The improved processing results in more ready millability and improved surface smoothness on extrusion.

EXAMPLES

In the examples all parts are by weight.

Example 1

Sample A

One hundred parts of a fluoroelastomer which is a terpolymer of 55.4 wt. %, 67.0 mole %, units derived from tetrafluoroethylene, 44.2 wt. %, 32.2 mole %, units derived from perfluoromethyl vinyl ether and 0.4 wt. %, 0.8 mole %, units derived from vinylidene fluoride was blended in a Brabender Plastograph at 340° C. for 5 minutes with 35 parts of a thermoplastic containing 97 wt. %, 99 mole %, units derived from tetrafluoroethylene and 3 wt. %, 1 mole %, units derived from perfluoropropyl vinyl ether. The resulting uniform blend was removed from the Plastograph, cooled to 25° C. and then compounded on a two roll rubber mill using the following formulation; 135 parts of above blend, 10 parts SAF carbon black, 4 parts lead oxide, 3 parts dipotassium salt of bisphenol AF

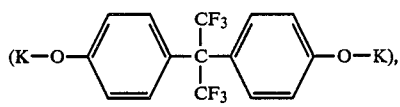

and 4parts DCH-18-crown-6(2,5,8,15,18,21-hexaoxa-tricyclo[20.4, 0.90, 14] hexaecosane).

Sample B (control)

The procedure of preparing Sample A is repeated except the fluoroelastomer and thermoplastic copolymer were blended on a two roll rubber mill at 100° C. The resulting blend was compounded on a two roll rubber mill with the same ingredients compounded in Sample A.

Sample C (control)

As a control the fluoroelastomer of Sample A, without the thermoplastic copolymer was compounded on a rubber mill at 100° C. The formulation was 100 parts fluoroelastomer, 10 parts SAF carbon black, 4 parts lead oxide, 3 parts dipotassium salt of bisphenol AF, 4 parts DCH-18-crown-6.

The above three compositions were sheeted out, pressed into 0.2 cm thick slabs, cured at 177° C. for 30 minutes, and post cured for two days under nitrogen at 288° C. Test pieces were cut from the slabs and subjected to the tests reported in Table I.

TABLE I

| SAMPLE | A | B | C |
|---|---|---|---|
| $M_{100}$ (MPa) | 14.5 | 11.8 | 7.5 |
| $T_B$ (MPa) | 18.0 | 12.2 | 13.8 |
| $E_B$ (%) | 120 | 110 | 155 |
| Tear (kN/m) | 4.4 | 3.5 | 2.7 | where $M_{100}$=modulus at 100% elongation
$T_B$=tensile strength at break (ASTM D-412)
$E_B$=elongation at break
Tear=tear strength (ASTM D-470)
The control contains no thermoplastic copolymer As can be seen from Table I, the cured composition, in which the thermoplastic copolymer was premixed into the fluoroelastomer at 340° C. (Sample A) exhibits significantly improved tear strength, tensile strength and modulus over the controls (Samples B and C).

Example 2

Sample A

One hundred parts of the fluoroelastomer of Example 1 was blended with 35 parts of a thermoplastic copolymer containing 84 wt. % units derived from tetrafluoroethylene, 16 wt. % units derived from hexafluoropropylene in a Brabender Plastograph at 340° C. for 5 minutes. The uniform blend was removed from the Plastograph, cooled to 25° C. and then compounded on a two roll rubber mill using the following formulation; 135 parts of the above blend, 10 parts SAF carbon black, 4 parts lead oxide, 3 parts dipotassium salt of bisphenol AF and 4 parts DCH-18-crown-6.

Sample B (control)

The procedure of preparing Sample A of this Example was repeated except the fluoroelastomer and thermoplastic copolymer were blended on a two roll rubber mill at 100° C. The resulting blend was compounded on a two roll rubber mill with the same ingredients compounded in Sample A.

Sample C (control)

As a control the fluoroelastomer of Sample A, without the thermoplastic copolymer was compounded on a rubber mill at 100° C. The formulation was as follows: 100 parts fluoroelastomer, 10 parts SAF carbon black, 4 parts lead oxide, 3 parts dipotassium salt of bisphenol AF, and 4 parts DCH-18-crown-6.

The above three compounds were sheeted out, pressed into 0.2 cm thick slabs, cured at 177° C. for 30 minutes, and post cured for two days under nitrogen at 288° C. Test pieces were cut from the slabs and subjected to the tests reported in Table II.

TABLE II

| SAMPLE | A | B | C |
|---|---|---|---|
| $M_{100}$ (MPa) | 9.5 | 9.5 | 7.5 |
| $T_B$ (MPa) | 18.8 | 12.5 | 13.8 |
| $E_B$ (%) | 180 | 145 | 155 |
| Tear (kN/m) | 5.3 | 5.2 | 2.7 | where $M_{100}$=modulus at 100% elongation
$T_B$=tensile strength at break (ASTM D-412)
$E_B$=elongation at break
Tear=tear strength (ASTM D-470)

As can be seen from Table II the cured composition, in which the thermoplastic copolymer was premixed into the fluoroelastomer at 340° C. (Sample A), exhibits significantly improved tensile strength and tear strength over (Sample C control) (with no thermoplastic copolymer) and significantly better tensile stregnth over the composition in which the thermoplastic copolymer and fluoroelastomer were pre-mixed on the mill at 100° C. (Sample B control).

Example 3

Sample A

One hundred parts of a fluoroelastomer containing 55 wt. %, 67.6 mole %, units derived from tetrafluoroethylene, 43 wt. %, 31.8 mole %, units derived from perfluoromethyl vinyl ether and 1.8 wt %, 0.6 mole %, units derived from perfluoro-2-phenoxypropyl ether was blended with 35 parts of a thermoplastic copolymer containing 97 wt %, units derived from tetrafluoroethylene and 3 wt. %, units derived from perfluoropropyl vinyl ether at 340° C. in a Brabender Plastograph for 5 minutes. The resulting uniform blend was removed from the Plastograph, cooled to 25° C., and then compounded on a two roll rubber mill using the following formulation; 135 parts of the above blend, 10 parts SAF carbon black, 4 parts lead oxide, 3 parts dipotassium salt of bisphenol AF and 4 parts DCH-18-crown-6.

Sample B (control)

The procedure of preparing Sample A of this Example was repeated except that the fluoroelastomer and thermoplastic copolymer were blended on a two roll rubber mill at 100° C. The resulting blend was compounded on a two roll rubber mill with the same ingredients compounded in Sample A.

Sample C (control)

As a control the fluoroelastomer of Sample A, without the thermoplastic copolymer was compounded on a rubber mill at 100° C. The formulation was as follows: 100 parts of the fluoroelastomer, 10 parts SAF carbon black, 4 parts lead oxide, 3 parts dipotassium salt of bisphenol AF, and 4 parts DCH-18-crown-6.

The above three compounds were sheeted out, pressed into 0.2 cm thick slabs, cured at 177° C. for 30 minutes, and post cured for two days under nitrogen at 288° C. Test pieces were cut from the slabs and subjected to the tests reported in Table III.

TABLE III

| SAMPLE | A | B | C |
|---|---|---|---|
| $M_{100}$ (MPa) | 13.5 | — | 7.5 |
| $T_B$ (MPa) | 19.2 | 9.8 | 15.0 |
| $E_B$ (%) | 140 | 90 | 160 |
| Tear (kN/m) | 4.4 | 3.8 | 3.6 | where $M_{100}$ = modulus at 100% elongation
$T_B$ = tensile strength at break (ASTM D-412)
$E_B$ = elongation at break
Tear = tear strength (ASTM D-470)

As can be seen from Table III the cured composition, in which the thermoplastic copolymer was premixed into the fluoroelastomer at 340° C. (Sample A), exhibits significantly improved tensile strength and tear strength over the controls with no thermoplastic copolymer (Sample C) and over the control in which the thermoplastic copolymer and fluoroelastomer were pre-mixed on the mill at 100° C. (Sample B).

Example 4

Sample A

One hundred parts of the fluoroelastomer used in Example 3 and 35 parts of a thermoplastic copolymer of 84 wt. %, units derived from tetrafluoroethylene, 16 wt. %, units derived from hexafluoropropylene were blended in a Brabender Plastograph at 340° C. for 5 minutes. The resulting uniform blend was removed from the Plastograph, cooled to 25° C. and then compounded on a two roll rubber mill using the following formulation; 135 parts of the above blend, 10 parts SAF carbon black, 4 parts lead oxide, 3 parts dipotassium salt of bisphenol AF and 4 parts DCH-18-crown-6.

Sample B (control)

The procedure of preparing Sample A of this Example was repeated except that the fluoroelastomer and thermoplastic copolymer were blended on a two roll rubber mill at 100° C. The resulting blend was compounded on a two roll rubber mill with the same ingredients compounded in Sample A.

Sample C (control)

As a control the fluoroelastomer of Sample A of this Example without the thermoplastic copolymer was compounded on a rubber mill at 100° C. The formulation was as follows: 100 parts of the fluoroelastomer of Sample A, 10 parts SAF carbon black, 4 parts lead oxide, 3 parts dipotassium salt of bisphenol AF, and 4 parts DCH-18-crown-6.

The above three compounds were sheeted out, pressed into 0.2 cm thick slabs, cured at 177° C. for 30minutes, and post cured for two days under nitrogen at 288° C. Test pieces were cut from the slabs and subjected to the tests reported in Table IV.

TABLE IV

| SAMPLE | A | B | C |
|---|---|---|---|
| $M_{100}$ MPa | 11.8 | 9.0 | 7.5 |
| $T_B$ MPa | 21.5 | 11.0 | 15.0 |
| $E_B$ (%) | 200 | 130 | 160 |
| Tear kN/m | 6.2 | 6.1 | 3.6 | where $M_{100}$ = modulus at 100% elongation
$T_B$ = tensile strength at break (ASTM D-412)
$E_B$ = elongation at break
Tear = tear strength (ASTM D-470)

As can be seen from Table 4, the cured composition, in which the fluoroelastomer and thermoplastic copolymer were premixed at 340° C. (Sample A), exhibits significantly improved tensile strength and tear strength over (control Sample C) and significantly improved tensile strenth over the composition in which the fluoroelastomer and thermoplastic copolymer were premixed on the mill at 100° C. (control Sample B).

Example 5

Sample A

One hundred parts of the fluoroelastomer used in Example 1 and 50 parts of the thermoplastic copolymer used in Example 1 were blended in a Brabender Plastograph at 340° C. for 5 minutes. The resulting uniform blend was removed from the Plastograph, cooled to 25° C. and then compounded on a two roll rubber mill using the following formulation; 150 parts of the above blend, 10 parts SAF carbon black, 4 parts lead oxide, 3 parts dipotassium salt of bisphenol AF and 4 parts DCH-18-crown-6.

Control

As a control the fluoroelastomer used to prepare Sample A of this Example was blended on a rubber mill at 100° C. with the curing ingredients without the thermoplastic copolymer. The formulation was as follows: 100 parts fluoroelastomer, 10 parts SAF carbon black, 4 parts lead oxide, 3 parts dipotassium salt of bisphenol AF, and 4 parts DCH-18-crown-6.

When the melt indices of Sample A (not previously cured) and the control (not previously cured) were measured at 372° C. in accordance with ASTM D-1238 using a 10 kg weight, including the weight of the piston, Sample A had a melt index of 3 g/10 min while the Control had a melt index of 1 g/10 min. In running these melt index tests the material extruded during the first 5 minutes was discarded and the material extruded during the next 10 minutes measured. In addition, it was observed that the processing behavior of Sample A was superior to the control.

To test the physical properties of the above compositions, the two compositions were sheeted out, pressed into 0.2 cm thick slabs, cured at 177° C. for 30 minutes and post cured under nitrogen for two days. Test pieces were cut from the slabs and subjected to the tests reported in Table V which were run at 177° C. to observe the high temperature performance of these compositions.

TABLE V

| SAMPLE | A | CONTROL |
| --- | --- | --- |
| Tensile Tests at 177° C. | | |
| $T_B$ (MPa) | 4.2 | 1.2 |
| $E_B$ (%) | 40 | 40 |
| Tear (kN/m) | 1.2 | 0.4 | where $T_B$ = tensile strength at break (ASTM D-412)
$E_B$ = elongation at break
Tear = tear strength (ASTM D-470)

As can be seen from Table V, the cured composition in which the thermoplastic copolymer was premixed into the fluoroelastomer at 340° C. (Sample A), exhibits significantly improved tensile strength and tear strength at 177° C. over the control without the thermoplastic copolymer.

Examples 6-9

In Examples 6-8 100 parts of a fluoroelastomer (FE) containing 56 wt. %, 68.5 mole %, units derived from tetrafluoroethylene, 42 wt. %, 30.9 mole %, units derived from perfluoromethyl vinyl ether and 2 wt. %, 0.6 mole %, units derived from perfluoro(8-cyano-5-methyl-3,6-dioxo-1-octene) is blended with a thermoplastic copolymer (TC) containing 97 wt. %, units derived from tetrafluoroethylene, 3 wt. % units derived from perfluoropropyl vinyl ether in the ratios reported in Table VI at 340° C. in a Brabender Plastograph (Examples 6 and 7) and in an extruder (Example 8). The temperature profile in the extruder was feed 180° C., melting 325° C., mixing 290° C. and a die temperature of 315° C. The resulting uniform blends were cooled to 25° C., and then compounded on a two roll rubber mill using the following formulation: 100 parts of above blend (Examples 6-8), the fluoroelastomer used in Examples 6-8. (Example 9), 3 parts tetraphenyl tin. The compositions were sheeted out, pressed into 0.2 cm thick slabs, cured at 177° C. for 30 minutes, and post cured under nitrogen in an oven where the temperature gradually rises to 288° C. over a period of 48 hours. Test pieces were cut from the slabs and subjected to the tests reported in Table VI.

TABLE VI

|  | Ex. 6 | Ex. 7 | Ex. 8 | Ex. 9 |
| --- | --- | --- | --- | --- |
| FE/TC | 80/20 | 72/28 | 75/25 | 100/0 |
| TC per 100 FE | 25 | 40 | 33 | 0 |
| Tensile Properties | | | | |
| $M_{100}$ psi | 900 | 1600 | 2900 | 1000 |
| (mPa) | 6.2 | 11 | 20 | 6.9 |
| $T_B$ psi | 2300 | 2850 | 3350 | 2000 |
| (MPa) | (16) | (20) | (23) | (14) |
| $E_B$ (%) | 225 | 175 | 120 | 140 |
| Tear Strength | | | | |
| 25° C. pli | 37 | 37 | 24.8 | 20.0 |
| (kN/m) | (6.5) | (6.5) | (4.4) | (3.5) |
| 100° C. pli | 7.3 | 10.3 | 7.1 | 3.0 |
| (kN/m) | (1.3) | (1.8) | (1.2) | (0.5) |
| 177° C. pli | 2.7 | 2.8 | | |
| (kN/m) | (0.5) | (0.5) | | |

As can be seen from Table IV the tensile strength and tear strength of the blends (Exs. 6-8) are substantially improved as compared with that of the fluoroelastomer alone (Ex. 9).

Examples 10 and 11

In Example 10, 100 parts of a fluoroelastomer (FE) containing 57 wt. %, 68.8 mole %, units derived from tetrafluoroethylene, 42 wt. %, 30.6 mole %, units derived from perfluoromethyl vinyl ether and 1 wt. %, 0.6 mole %, units derived from 4-bromo-3,3,4,4-tetrafluorobutene-1 was blended with a thermoplastic copolymer (TC) containing 97 wt. %, units derived from tetrafluoroethylene, 3 wt. %, units derived from perfluoropropyl vinyl ether in a ratio of 100 parts fluoroelastomer to 33 parts thermoplastic copolymer in a Brabender Plastograph at 340° C. for 5 minutes. The resulting uniform blend was cooled to 25° C. and compounded on a two roll rubber mill. The fluoroelastomer (Example 11) was also compounded on a two roll rubber mill. In each case 100 parts of blend or fluoroelastomer was compounded with 4 parts lead oxide, 7 parts triallyl isocyanurate stabilized with a small amount of hydroquinone and 4 parts of a 50% active dispersion of 2,5-dimethyl-2,5-di(t-butyl-peroxy)hexane. The stacks were sheeted out, pressed into 0.2 cm thick slabs, cured at 190° C. for 15 minutes and post cured in an oven under nitrogen where the temperature rose slowly to 288° C. over a period of 48 hours. Test pieces were cut from the slabs and subjected to the tests reported in Table VII.

TABLE VII

|  | Ex. 10 | Ex. 11 |
| --- | --- | --- |
| FE/TC | 75/25 | 100/0 |
| TC per 100 FE | 33 | |
| Method of melt mixing | Brabender | |
| Tensile Properties | | |
| $T_B$ at 25° C. psi | 2000 | 1650 |
| (MPa) | (14) | (11) |
| 100° C. psi | 480 | 300 |
| (MPa) | (3.3) | (2.1) |
| 200° C. psi | 200 | 50 |
| (MPa) | (1.4) | (0.4) |
| $E_B$ at 25° C. % | 85 | 105 |
| 100° C. % | 40 | 50 |
| 200° C. % | 20 | 15 |

As can be seen from Table VII the cured compositions, in which the thermoplastic copolymer was premixed with the fluoroelastomer at 340° C. exhibits significantly improved tensile strength over the fluoroelastomer alone.

Example 12

Sample A

One hundred parts of a fluoroelastomer containing 59.2 wt. %, 70.4 mole %, units derived from tetrafluoroethylene, 40.5 wt. %, 29.0 mole %, units derived from perfluoromethylvinyl ether and 0.33 wt. %, 0.6 mole %, units derived from vinylidene fluoride and 11 parts of the thermoplastic fluoropolymer used in Example 1 were blended in a Brabender Plastograph at 340° C. for 5 minutes. The resulting uniform blend was removed from the Plastograph, cooled to 25° C. and then compounded on a two roll rubber mill at 100° C. using the following formulation; 115 parts of the above blend, 3 parts SAF carbon black, 4 parts lead oxide, 3 parts dipotassium salt of bisphenol AF and 4 parts DCH-18-crown-6.

Sample B

This sample was prepared the same as Sample A except 14 parts of the thermoplastic fluorocarbon were used.

The above two compounds were sheeted out, pressed into 0.2 cm thick slabs, cured at 177° C. for 30 minutes, and post cured for two days under nitrogen at 288° C. Test pieces were cut from the slabs and subjected to the tests reported in Table VIII.

TABLE VIII

|  | Sample A | Sample B |
| --- | --- | --- |
| $M_{100}$ psi (Mpa) | 1450 (10.0) | 1750 (15.0) |
| $T_b$ psi (Mpa) | 2350 (16.2) | 2450 (16.8) |
| $E_b$ (%) | 180 | 150 |
| Tear pli (kN/m) | 29.9 (5.2) | 29.0 (5.1) |

EXAMPLE 13

Sample A

One hundred parts of a fluoroelastomer which is a terpolymer of 59.2 wt. %, 70.4 mole %, units derived from tetrafluoroethylene, 40.5 wt. %, 29.0 mole %, units derived from perfluoromethylvinyl ether and 0.33 wt. %, 0.6 mole %, units derived from vinylidene fluoride was blended in a Brabender Plastograph at 340° C. for 5 minutes with 15 parts of the thermoplastic fluoropolymer used in Example 1. The resulting uniform blend was removed from the Plastograph, cooled to 25° C. and then compounded on a two roll rubber mill using the following formulations; 115 parts of the above blend, 5 parts SAF carbon black, 4 parts lead oxide, 3 parts of the dipotassium salt of bisphenol AF, and 4 parts DCH-18-crown 6.

Sample B (control)

As a control the fluoroelastomer of Sample A of this Example was compounded on a rubber mill at 100° C. The formulation was 100 parts fluoroelastomer, 10 parts SAF carbon black, 4 parts lead oxide, 3 parts of the dipotassium salt of bisphenol AF, and 4 parts DCH-18-crown-6.

The above two compositions were sheeted out, pressed into 0.2 cm thick slabs, cured at 177° C. for 30 minutes, and post cured for two days under nitrogen at 288° C. Test pieces were cut from the slabs and subjected to the tests reported in Table IX.

TABLE IX

|  | Sample A | Sample B |
| --- | --- | --- |
| $M_{100}$ psi (Mpa) | 1400 (9.7) | 1300 (9.0) |
| $T_b$ psi (Mpa) | 2450 (16.8) | 1950 (13.5) |
| $E_b$ (%) | 160 | 130 |

The control had 10 parts SAF carbon black while the blend had only 5 parts SAF carbon black, otherwise the difference in $M_{100}$ would have been larger.

We claim:

1. A melt blended composition comprising (A) 100 parts by weight of a cured fluoroelastomer consisting essentially of from 79.9 to 52 mole % units derived from tetrafluoroethylene, 20 to 45 mole % units derived from a perfluoroalkylvinyl ether wherein the alkyl group contains from 1 to 10 carbon atoms, and 0.1 to 4.0 mole % cure site monomer units derived from vinyldiene fluoride, trifluoroethylene, vinyl fluoride, $CH_2=CHR_f$ where $R_f$ is a perfluoroalkyl group containing from 1 to 5 carbon atoms, perfluorophenoxy substituted perfluoroalkylene vinyl ethers wherein the perfluoroalkylene group contains from 1 to 5 carbon atoms, $N=C(R'_f-O)_nCF=CF_2$ where $R'_f$ is a perfluoroalkylene group of 2 or 3 carbon atoms and n is 1-4, fluoroolefins of 2 to 5 carbon atoms containing 1 or 2 bromo substitutents or fluoroolefins of 2 to 5 carbon atoms, containing 1 or 2 iodo substituents, (B) and from 2 to 50 parts by weight of a thermoplastic perfluorocarbon copolymer containing at least 50 mole % units derived from tetrafluoroethylene having a melting point above 300° C. which is present as generally spherical particles having a particle size of less then about 10 microns, said composition being melt blended at a temperature which is sufficiently high to melt the thermoplastic tetrafluoroethylene copolymer.

2. A process of preparing a blend of (A) 100 parts of fluoroelastomer consisting essentially of from 79.9 to 52 mole % units derived from tetrafluoroethylene, 20 to 45 mole % units derived from a perfluoroalkylvinyl ether wherein the alkyl group contains from 1 to 10 carbon atoms, and 0.1 to 4.0 mold % cure site monomer units derived from a vinylidene fluoride, trifluoroethylene, vinyl fluoride, $CH_2=CHR_f$ where $R_f$ is a perfluoroalkyl group containing from 1 to 5 carbon atoms, perfluorophenoxy substituted perfluoroalkylene vinyl ethers wherein the perfluoroalkylene group contains from 1 to 5 carbon atoms, $N=C(R'_f-O)_nCF=CF_2$ where $R'_f$ is a perfluoroalkylene group of 2 or 3 carbon atoms and n is 1-4, fluoroolefins of 2 to 5 carbon atoms containing 1 or 2 bromo substituents or fluoroolefins of 2 to 5 carbon atoms containing 1 or 2 iodo substituents, and (B) from 2 to 50 parts by weight of a thermoplastic copolymer containing at least 50 mole % units derived from tetrafluoroethylene comprising blending said fluoroelastomer and thermoplastic copolymer at a temperature above the melting point of the thermoplastic copolymer followed by addition of curing ingredients at below 100° C. and curing the fluoroelastomer.

3. The composition of claim 1 wherein the thermoplastic perfluorocarbon contains 50 to 98 mole % units derived from tetrafluoroethylene and 2 to 50 mole % units derived from hexafluoropropylene or a perfluoroalkylvinyl ether wherein the perfluoroalkyl group contains from 1 to 10 carbon atoms.

4. The composition of claim 3 wherein the fluoroelastomer contains from 74.8 to 57 mole % units derived from tetrafluoroethylene, 25 to 40 mole % units derived from perfluoroalkylvinyl ether and 0.2 to 3.0 mole % cure site monomer derived units.

5. The composition of claim 4 wherein the thermoplastic perfluorocarbon contains from 97 to 75 mole % units derived from tetrafluoroethylene and 3 to 25 mole % units derived from hexafluoropropylene or perfluoroalkylvinyl ether.

6. The composition of claim 5 wherein there is present from 5 to 30 parts by weight thermoplastic perfluorocarbon copolymer per 100 parts by weight fluoroelastomer.

7. The composition of claim 1 wherein a curing agent is present adapted to cure the cure site monomer units present.

8. The composition of claim 7 wherein the fluoroelastomer contains 79.9 to 52 mole % units derived from tetrafluoroethylene, 20 to 45 mole % units derived from perfluoroalkylvinyl ether wherein the alkyl group contains from 1 to 10 carbon atoms, and 0.1 to 4.0 mole % of units derived from a cure site monomer.

9. The composition of claim 8 wherein the thermoplastic perfluorocarbon contains 50 to 98 mole % units derived from tetrafluoroethylene and 2 to 50 mole % units derived from hexafluoropropylene or a perfluoroalkylvinyl ether wherein the alkyl group contains from 1 to 10 carbon atoms. r 10. The composition of claim 9 wherein the cure site monomer units are derived from vinylidene fluoride, trifluoroethylene, vinyl fluoride, ethylene, $CH_2=CHR_f$ wherein $R_f$ is a perfluoroalkyl group containing 1 to 5 carbon atoms, perfluorophenoxy substituted perfluoroalkylene vinyl ethers wherein the perfluoroalkylene group contains from 1 to 5 carbon atoms, N C($R'_f$—O)$_n$CF=CF$_2$ where $R'_f$ is a perfluoroalkylene group of 2 or 3 carbon atoms and n is 1–4, fluoroolefins of 2 to 5 carbon atoms containing 1 or 2 bromo substituents or fluoroolefins of 2 to 5 carbons atoms containing 1 or 2 iodo substituents.

11. The composition of claim 10 wherein the fluoroelastomer contains from 74.8 to 57 mole % units derived from tetrafluoroethylene, 25 to 40 mole % units derived from perfluoroalkylvinyl ether and 0.2 to 3.0 mole % cure site monomer derived units.

12. The composition of claim 11 wherein the thermoplastic perfluorocarbon contains from 97 to 75 mole % units derived from tetrafluoroethylene and 3 to 25 mole % units derived from hexafluoropropylene or perfluoroalkylvinyl ether.

13. The composition of claim 12 wherein there is present 5 to 30 weight percent thermoplastic perfluorocarbon per 100 parts fluoroelastomer.

14. The process of claim 2 wherein the thermoplastic perfluorocarbon contains 50 to 98 mole % units derived from tetrafluoroethylene and 2 to 50 mole % units derived from hexafluoropropylene or a perfluoroalkylvinyl ether wherein the alkyl group contains from 1 to 10 carbon atoms.

15. The process of claim 14 wherein the fluoroelastomer contains from 74.8 to 57 mole % units derived from tetrafluoroethylene, 25 to 40 mole % units derived from perfluoroalkylvinyl ether and 0.2 to 3.0 mole % cure site monomer derived units.

16. The process of claim 15 wherein the thermoplastic perfluorocarbon contains from 97 to 75 mole % units derived from tetrafluoroethylene and 3 to 25 mole % units derived from hexafluoropropylene or perfluoroalkylvinyl ether.

17. The process of claim 16 wherein there is present from 5 to 30 parts by weight thermoplastic perfluorocarbon copolymer per 100 parts by weight fluoroelastomer.

\* \* \* \* \*